United States Patent
Wang et al.

(10) Patent No.: US 12,265,451 B2
(45) Date of Patent: Apr. 1, 2025

(54) DATA PROCESSING METHOD AND APPARATUS IN STORAGE SYSTEM, AND STORAGE SYSTEM

(71) Applicant: HUAWEI TECHNOLOGIES CO., LTD., Shenzhen (CN)

(72) Inventors: Daohui Wang, Shenzhen (CN); Chi Song, Shenzhen (CN); Tonglei Wang, Shenzhen (CN); Yun Zhan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 373 days.

(21) Appl. No.: 17/569,908

(22) Filed: Jan. 6, 2022

(65) Prior Publication Data

US 2022/0129346 A1 Apr. 28, 2022

Related U.S. Application Data (63) Continuation of application No. PCT/CN2019/104981, filed on Sep. 9, 2019.

(51) Int. Cl.
*G06F 11/00* (2006.01)
*G06F 11/10* (2006.01)

(52) U.S. Cl.
CPC .................. *G06F 11/108* (2013.01)

(58) Field of Classification Search
CPC ............... G06F 11/108; G06F 11/0727; G06F 11/1076; G06F 11/1032
See application file for complete search history.

(56) References Cited

U.S. PATENT DOCUMENTS

| | | |
|---|---|---|
| 2012/0151255 A1 | 6/2012 | Lee et al. |
| 2015/0149819 A1 | 5/2015 | Lee |
| 2017/0206135 A1 | 7/2017 | Zeng |
| 2018/0024877 A1* | 1/2018 | Gold .................. G06F 11/1044 714/773 |
| 2018/0341547 A1* | 11/2018 | Bolkhovitin ............ G06F 13/28 |
| 2018/0373435 A1* | 12/2018 | Hayasaka ............... G06F 3/065 |
| 2019/0243553 A1 | 8/2019 | Yamamoto et al. |

(Continued)

FOREIGN PATENT DOCUMENTS

| | | |
|---|---|---|
| CN | 102521269 A | 6/2012 |
| CN | 103699494 A | 4/2014 |
| CN | 105353988 A | 2/2016 |

(Continued)

OTHER PUBLICATIONS

Anonymous., "Type-length-value", Wikipedia, Apr. 13, 2015, XP055350805, 3 pages.

*Primary Examiner* — Joseph D Manoskey
(74) *Attorney, Agent, or Firm* — Maier & Maier, PLLC (57) ABSTRACT

A data processing method in a storage system and the storage system, and relates to the field of data storage technologies. A client first sends a data block in a stripe and metadata of the data block to a data storage node. The client then sends the metadata of the data block and a parity block to a parity storage node, to back up the metadata of the data block on the parity storage node. When the metadata of the data block is successfully backed up, the data block is written into a corresponding storage device based on a storage location indicated by the metadata. This reduces write operation time.

10 Claims, 4 Drawing Sheets

(56) References Cited

U.S. PATENT DOCUMENTS

2021/0133026 A1\* 5/2021 Horn .................. G06F 11/1076

FOREIGN PATENT DOCUMENTS

| CN | 107423422 A | 12/2017 |
| CN | 109144406 A | 1/2019 |
| CN | 109213420 A | 1/2019 |
| CN | 109542342 A | 3/2019 |
| CN | 109814805 A | 5/2019 |
| WO | 2016023005 A1 | 2/2016 |
| WO | 2017161050 A2 | 9/2017 |

\* cited by examiner

FIG. 6

DATA PROCESSING METHOD AND APPARATUS IN STORAGE SYSTEM, AND STORAGE SYSTEM

CROSS-REFERENCE TO RELATED APPLICATIONS

This application is a continuation of International Application No. PCT/CN2019/104981, filed on Sep. 9, 2019, the disclosure of which is hereby incorporated by reference in its entirety.

TECHNICAL FIELD

The embodiments relate to the field of data storage technologies, and in particular, to a data processing method and apparatus in a storage system, and a storage medium.

BACKGROUND

A target device in a storage system may write to-be-written service data into a storage device on a corresponding storage node in the storage system in a form of a stripe by using an erasure coding (EC) technology.

A process in which a client writes data may be as follows: A client of the storage system divides to-be-written service data into data blocks based on a size of a stripe unit in a stripe, and generates parity blocks of the data blocks according to an EC algorithm. The client sends the data blocks and metadata of the data blocks to a storage node for storing the data blocks, and sends the parity blocks to a storage node for storing the parity blocks. After receiving the data blocks and the metadata of the data blocks, a storage device backs up, according to a backup policy, the metadata of the data blocks to a storage node for storing the metadata of the data blocks. When the metadata of the data blocks is successfully backed up to the storage node for storing the metadata of the data blocks, the storage node writes the data blocks into a corresponding storage device on the storage node based on a storage location indicated by the metadata, and returns a write success response to the client.

In the foregoing data writing process, the storage node can write the data blocks into the storage device only after the metadata is successfully backed up. Consequently, write operation time is excessively long.

SUMMARY

The embodiments provide a data processing method in a storage system, the storage system, a computer device, and a storage medium, to overcome a problem of excessively long write operation time in a related technology.

According to a first aspect, the embodiments provide a data processing method in a storage system. The storage system includes a client, a data storage node, and a parity storage node, and the method includes:

The client sends a data parity in a stripe and metadata of the data block to the data storage node.

The client sends a parity block in the stripe and the metadata of the data block to the parity storage node. The parity block is generated according to the data block in the stripe and a parity algorithm. A size of a parity block in the stripe is the same as a size of a data block in the stripe and is equal to a size of a stripe unit in the stripe. The metadata of the data block includes a correspondence between a user access address of the data block and an identifier of the stripe unit that stores the data block in the stripe.

In the foregoing implementation, the client sends the data block in the stripe and the metadata of the data block to the data storage node, and sends the metadata of the data block and the parity block to the parity storage node, to back up the metadata of the data block on the parity storage node. This reduces write operation time.

In a possible implementation, the metadata of the data block further includes a timestamp.

In a possible implementation, the client obtains the timestamp of the data block, and determines a timestamp of a new data block based on the timestamp, where the new data block and the data block have a same user access address.

According to a second aspect, the embodiments provide a data processing method in a storage system. The storage system includes a client, a data storage node, a metadata storage node, and a parity storage node, and the method includes:

The data storage node receives a write request sent by the client, where the write request includes a data block of a stripe and metadata of the data block that are written into a storage device in the data storage node. A parity block of the stripe is stored in a storage device of the parity storage node. A memory of the parity storage node is further configured to store the metadata of the data block and record, in a log, a write operation of the metadata of the data block. The parity block is generated according to the data block in the stripe and a parity algorithm. A size of a parity block in the stripe is the same as a size of a data block in the stripe and is equal to a size of a stripe unit in the stripe. The metadata of the data block includes a correspondence between a user access address of the data block and an identifier of the stripe unit that stores the data block in the stripe.

The data storage node sends a write request response to the client, where the write request response is used to indicate completion of a write request operation.

Based on the foregoing implementation, the client writes the metadata of the data block into a parity storage device when writing the parity block into the parity storage device. This increases efficiency of storing a metadata copy of the data block, and reduces write operation time.

In a possible implementation, the method further includes: the data storage node stores the metadata of the data block in the metadata storage node after the data storage node sends the write request response to the client.

In a possible implementation, the metadata of the data block further includes a timestamp, and the method further includes:

The data storage node notifies the parity storage node of deleting metadata of an old data block in the memory of the parity storage node and a write operation that is of the metadata of the old data block and that is recorded in the log. The old data block and the data block include a same user access address, and a timestamp of the old data block is earlier than the timestamp of the metadata of the data block.

Based on the foregoing possible implementations, the metadata of the old data block with the same user access address is eliminated from the memory of the parity storage node, to release a memory space of the parity storage node.

In a possible implementation, the method further includes:

when the data storage node recovers from a fault, obtaining, by the data storage node from the parity storage node in the log, the write operation of the metadata that is of the data block and that includes the user access address;

determining, in the log, metadata of a data block with a latest timestamp from the write operation of the metadata that is of the data block and that includes the user access address; and using the metadata of the data block with the latest timestamp as the metadata of the data block corresponding to the user access address.

Based on the foregoing possible implementation, the storage node selects, from metadata of data blocks with a same user access address, the metadata of the data block with the latest timestamp as metadata of a latest data block. This ensures data consistency.

According to a third aspect, the embodiments provide a data processing method in a storage system. The storage system includes a client, a data storage node, a metadata storage node, and a parity storage node, and the method includes:

The parity storage node receives a write request sent by the client, where the write request includes metadata of a data block of a stripe and a parity block that are written into a storage device in the data storage node. The parity block is generated according to the data block in the stripe and a parity algorithm. A size of a parity block in the stripe is the same as a size of a data block in the stripe and is equal to a size of a stripe unit in the stripe. The metadata of the data block includes a correspondence between a user access address of the data block and an identifier of the stripe unit that stores the data block in the stripe.

The parity storage node caches the data block in a memory, and records, in a log, a write operation of the metadata of the data block.

In a possible implementation, the metadata of the data block further includes a timestamp.

In a possible implementation, the method further includes:

The parity storage node receives a notification sent by the data storage node, where the notification is used to indicate the parity storage node to delete metadata of an old data block in the memory of the parity storage node and a write operation that is of the metadata of the old data block and that is recorded in the log. The old data block and the data block include a same user access address, and a timestamp of the old data block is earlier than the timestamp of the metadata of the data block.

The parity storage node deletes, according to the notification, the metadata of the old data block in the memory and the write operation that is of the metadata of the old data block and that is recorded in the log.

In a possible implementation, the method further includes:

The parity storage node receives a log obtaining request sent by the data storage node, where the log obtaining request is used to obtain, from the parity storage node in the log, the write operation of the metadata that is of the data block and that includes the user access address.

The parity storage node sends the write operation of the metadata that is of the data block and that includes the user access address to the data storage node.

According to a fourth aspect, the embodiments provide a storage system, where the storage system includes a data storage node and a parity storage node.

The data storage node is configured to:
receive a first write request sent by the client, where the first write request includes a data block of a stripe and metadata of the data block that are written into a storage device in the data storage node, and the metadata of the data block includes a correspondence between a user access address of the data block and an identifier of a stripe unit that stores the data block in the stripe; and send a write request response to the client, where the write request response is used to indicate completion of the first write request.

The parity storage node is configured to: receive a second write request sent by the client, where the second write request includes the metadata of the data block and a parity block, the parity block is generated according to the data block in the stripe and a parity algorithm, and a size of a parity block in the stripe is same as a size of a data block in the stripe, and is equal to a size of a stripe unit in the stripe; and cache the data block in a memory of the parity storage node, and record, in a log, a write operation of the metadata of the data block.

In a possible implementation, the data storage node is further configured to store the metadata of the data block in the metadata storage node after sending the write request response to the client.

In a possible implementation, the metadata of the data block further includes a timestamp.

The data storage node is further configured to notify the parity storage node to delete metadata of an old data block in the memory of the parity storage node and a write operation that is of the metadata of the old data block and that is recorded in the log. The old data block and the data block include a same user access address, and a timestamp of the old data block is earlier than the timestamp of the metadata of the data block.

The parity storage node is further configured to: receive a notification sent by the data storage node, and delete, according to the notification, the metadata of the old data block in the memory and the write operation that is of the metadata of the old data block and that is recorded in the log.

Based on the foregoing possible implementations, the metadata of the old data block with the same user access address is eliminated from the memory of the parity storage node, to release a memory space of the parity storage node.

According to a fifth aspect, the embodiments provide a client, and the client includes a processor and an interface. The processor communicates with the interface, and the processor is configured to perform an operation to implement the method according to any one of the first aspect or the optional manners of the first aspect.

According to a sixth aspect, the embodiments provide a data storage node, and the data storage node includes a processor and an interface. The processor communicates with the interface, and the processor is configured to perform an operation to implement the method according to any one of the second aspect or the optional manners of the second aspect.

According to a seventh aspect, the embodiments provide a parity storage node, and the parity storage node includes a processor and an interface. The processor communicates with the interface, and the processor is configured to perform an operation to implement the method according to any one of the third aspect or the optional manners of the third aspect.

According to an eighth aspect, the embodiments provide a data processing apparatus in a storage system, configured to perform the data processing method in the storage system. The data processing apparatus in the storage system includes modules configured to perform the data processing method in the storage system provided in any one of the first aspect or the optional manners of the first aspect.

According to a ninth aspect, the embodiments provide a data processing apparatus in a storage system, configured to perform the data processing method in the storage system. The data processing apparatus in the storage system includes modules configured to perform the data processing method in the storage system provided in any one of the second aspect or the optional manners of the second aspect.

According to a tenth aspect, the embodiments provide a data processing apparatus in a storage system, configured to perform the data processing method in the storage system. The data processing apparatus in the storage system includes modules configured to perform the data processing method in the storage system provided in any one of the third aspect or the optional manners of the third aspect.

According to an eleventh aspect, the embodiments provide a storage medium, and the storage medium stores at least one instruction. A processor loads and executes the instruction to implement the method according to any one of the first aspect or the optional manners of the first aspect.

According to a twelfth aspect, the embodiments provide a storage medium, and the storage medium stores at least one instruction. A processor loads and executes the instruction to implement the method according to any one of the second aspect or the optional manners of the second aspect.

According to a thirteenth aspect, the embodiments provide a storage medium, and the storage medium stores at least one instruction. A processor loads and executes the instruction to implement the method according to any one of the third aspect or the optional manners of the third aspect.

DETAILED DESCRIPTION OF THE EMBODIMENTS

To make objectives, solutions, and advantages of the embodiments clearer, the following further describes the embodiments in detail with reference to accompanying drawings.

Figure 1:
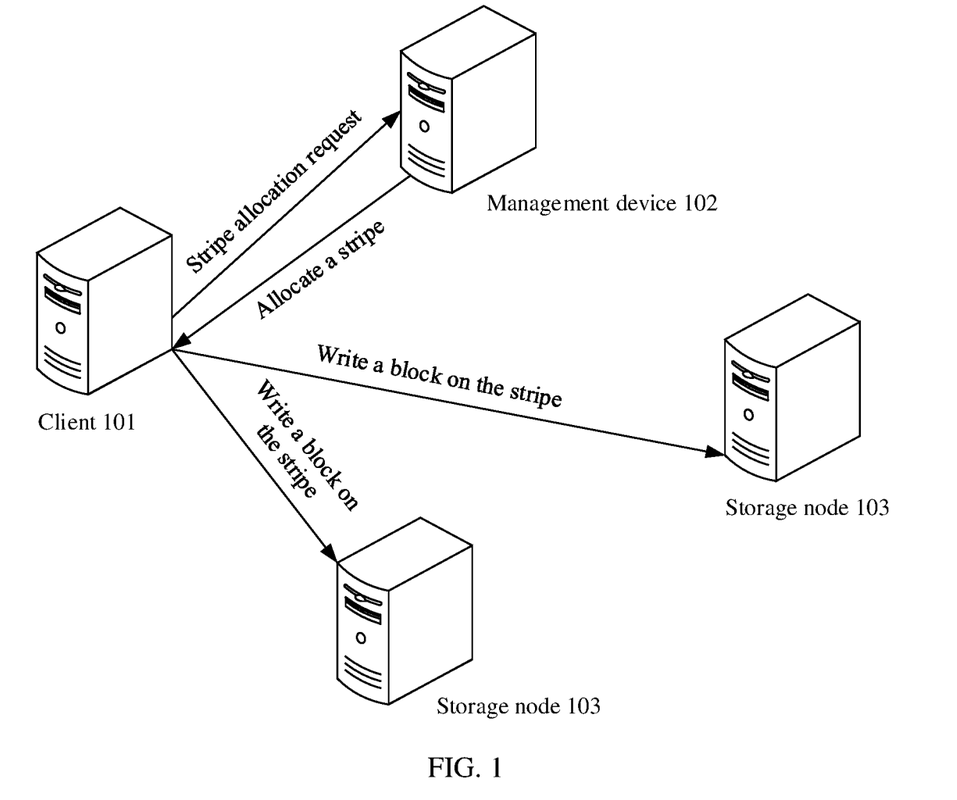
FIG. 1 is a schematic diagram of a storage system according to an embodiment.

FIG. 1 is a schematic diagram of a storage system according to an embodiment. Referring to FIG. 1, the storage system includes a client 101, a management device 102, and a storage node 103. To ensure redundancy of the storage system, the storage system may store service data of a user in a form of a stripe. One stripe may include N+M blocks, and the N+M blocks include N data blocks and M parity blocks. The N data blocks are used to store the service data (to-be-written service data) of the user, and the M parity blocks are used to store parity data of the service data, where N and M are positive integers greater than 0.

The client 101 is responsible for writing and reading the service data. The client 101 may request the management device 102 to allocate a stripe. The stripe includes a plurality of stripe units, and each stripe unit is configured to store one block. An erasure coding (EC) relationship is constituted between the plurality of stripe units of the stripe. A plurality of stripe units in one stripe have a same size. Each stripe unit has a stripe unit identifier.

The management device 102 records a correspondence between an identifier of a stripe unit of one stripe and a storage device that is on the storage node 103 and that provides a storage space for the stripe unit. The client 101 requests the management device 102 to allocate a stripe. The management device 102 allocates the stripe to the client 101 and provides an identifier of a stripe unit in the stripe.

Then, the client 101 divides the service data into data blocks based on a size of the stripe unit and generates a parity block of each data block according to an EC algorithm. A size of the data block is the same as a size of the parity block and is equal to the size of the stripe unit. The service data sent by the user to the client 101 carries a user access address corresponding to the service data. For example, the user access address may be a logical block address (logical block address, LBA). In another scenario, the user access address may alternatively be another identifier that can be identified by the user. This is not limited in this embodiment. The user in this embodiment is a device that writes the service data or reads the service data.

The client 101 divides a service data into data blocks, and each data block has a corresponding user access address. The client 101 records, based on the stripe unit identifier of the stripe allocated by the management device 102, a correspondence between the user access address of the data block and the stripe unit identifier of the stripe unit that stores the data block, in other words, records metadata of the data block. The metadata of the block is used to indicate a storage location of the block, and the metadata of the block may include a storage location of the stripe unit that stores the block on the storage node 103.

Further, in this embodiment, the storage system further includes a partitioned view, and the partitioned view is used to record correspondences between stripe units of all stripes in one partition and the storage device that is on the storage node 103 and that provides storage spaces for the stripe units of the stripes. In an implementation, the correspondence may be a correspondence between the stripe unit identifier and a storage device identifier. Therefore, after the management device 102 allocates the stripe, the client 101 may write, based on the stripe unit identifier of the stripe, the data block and the parity block into a storage device corresponding to the corresponding stripe identifier.

The storage device in this embodiment may be a hard disk drive or may be a solid-state drive. The service data may include block data, file data, object data, or the like. Content of the service data is not limited in this embodiment.

In this embodiment, a storage node 103 that is configured to provide the storage device and store the data block is referred to as a data storage node, while a storage node 103 that is configured to provide the storage device and store the parity block is referred to as a parity storage node.

With reference to the descriptions of the devices in the storage system, an embodiment provides a data writing method. The client 101 sends a stripe allocation request to the management device 102, where the stripe allocation request is used to indicate that the stripe is requested for allocation. The management device 102 returns stripe information to the client 101 according to the stripe allocation request, where the stripe information carries the identifier of the stripe unit of the stripe. The client 101 receives the stripe information returned by the management device 102.

Figure 2:
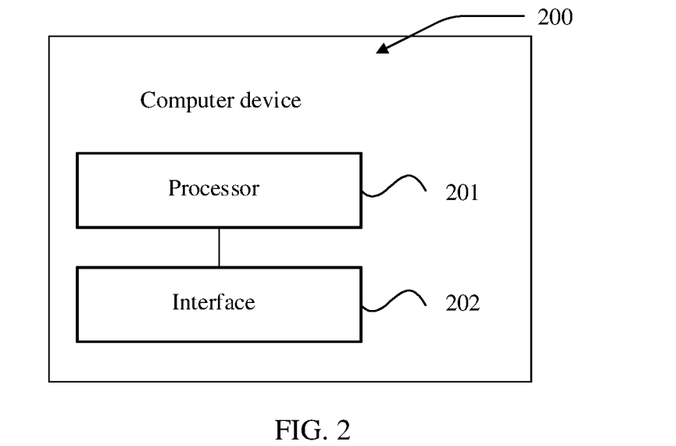
FIG. 2 is a schematic structural diagram of a computer device according to an embodiment.

The client 101, the management device 102, and the storage node 103 may be computer devices. FIG. 2 is a schematic structural diagram of a computer device 200 according to an embodiment. The computer device 200 includes components that vary considerably depending on different configurations or performances and may include one or more processors 201 and an interface 202. The processor 201 may be a central processing unit (CPU). The processor 201 is configured to perform a method performed by a corresponding device provided in each method embodiment. The interface 202 may be a network interface card, a host bus adapter, or the like. This is not limited in this embodiment. The processor 201 communicates with the interface 202. The computer device 200 may further include a hard disk, for example, a hard disk drive or a solid-state drive (SSD). The computer device 200 may further include another component configured to implement a device function.

In an example embodiment, a non-transitory computer-readable storage medium is further provided, for example, a memory including an instruction. The processor 201 in the computer device 200 may execute the instruction to complete data reconstruction methods in the following embodiments. For example, the non-transitory computer-readable storage medium may be a read-only memory (ROM), a random access memory (RAM), a compact disc read-only memory (CD-ROM), a magnetic tape, a floppy disk, an optical data storage device, or the like.

Figure 3A:
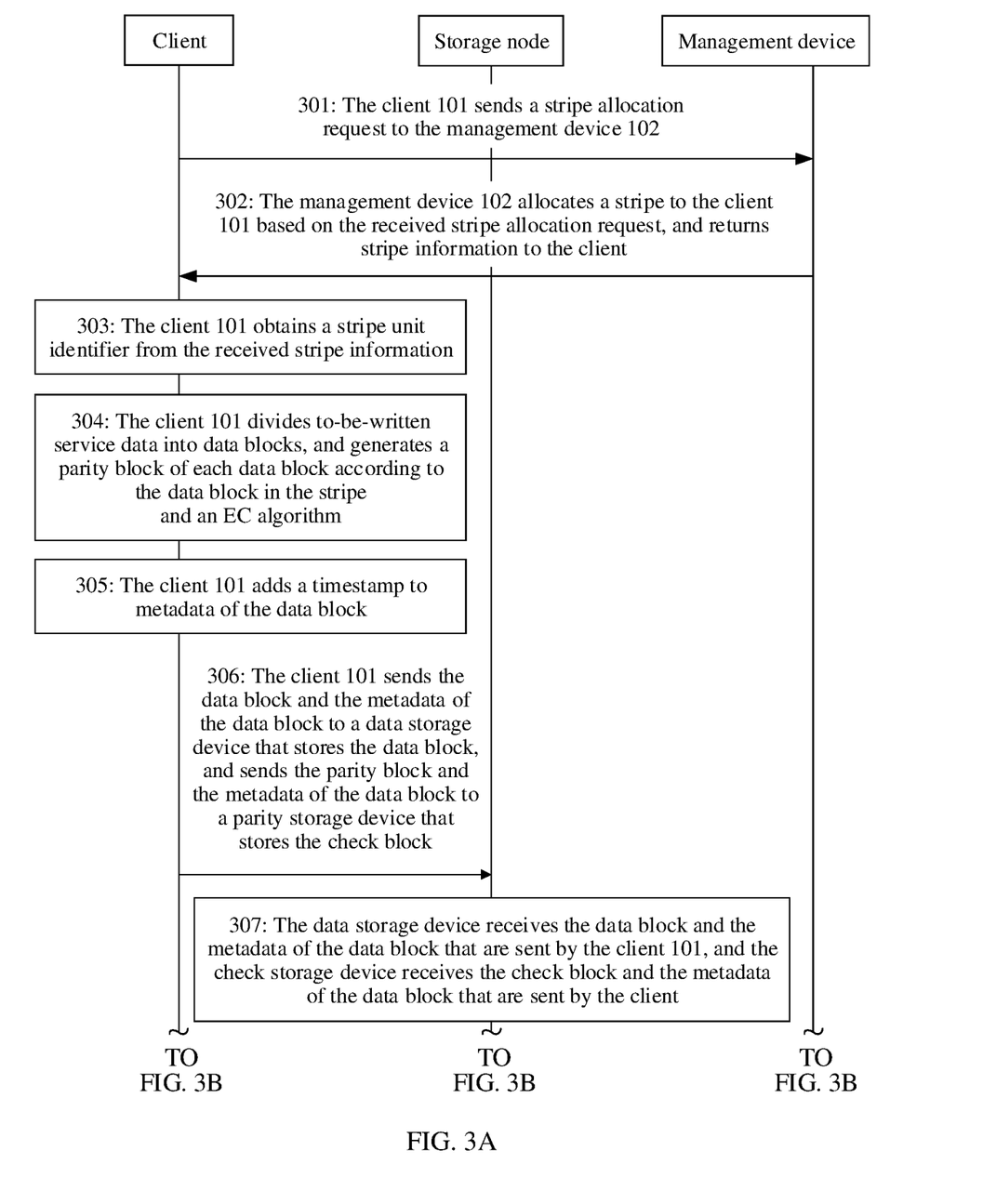
FIG. 3A and FIG. 3B are a flowchart of a data processing method in a storage system according to an embodiment.
Figure 3B:
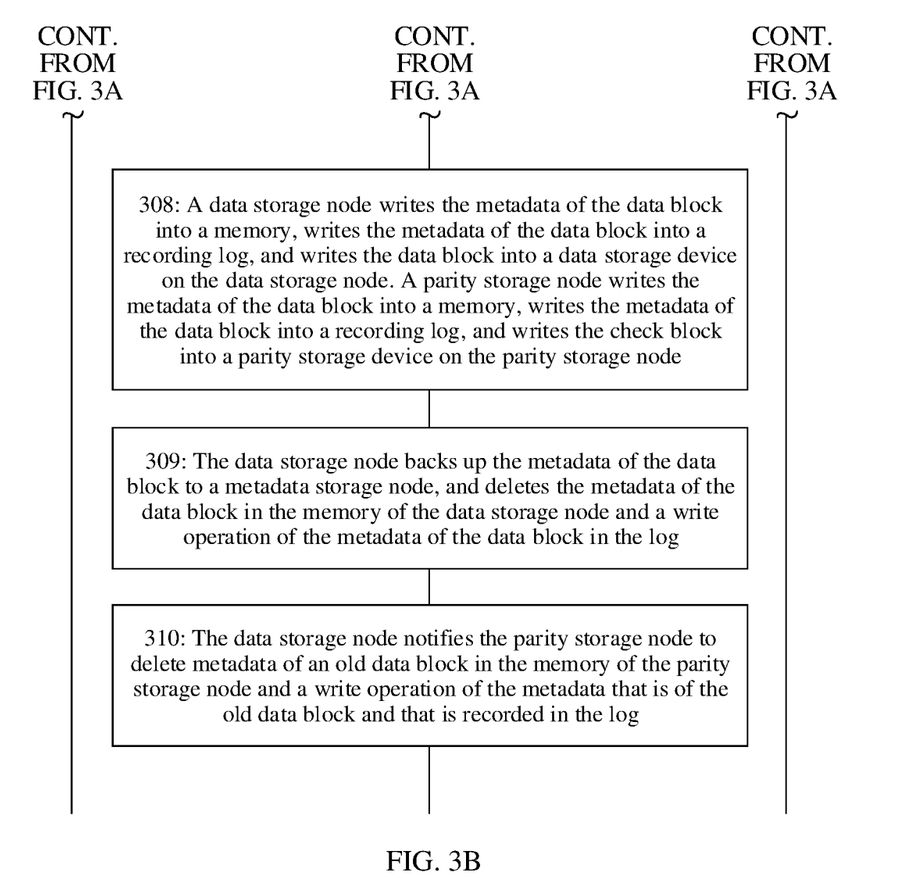

To indicate a process in which the storage system writes data, refer to a flowchart of a data processing method in a storage system according to an embodiment shown in FIG. 3A and FIG. 3B. A procedure of the method includes the following steps 301 to 310.

301: A client 101 sends a stripe allocation request to a management device 102, where the stripe allocation request is used to indicate that a stripe is requested for allocation.

The stripe is used to store to-be-written service data. The client 101 may divide the to-be-written service data into data blocks based on the stripe allocated by the management device 102 and generate a parity block of each data block according to an EC algorithm. The client 101 writes, according to a partitioned view, the data block and the parity block into a storage device on a storage node 103 corresponding to a stripe unit.

There are a relatively large quantity of clients 101 in the storage system. Therefore, the stripe allocation request may carry a device identifier of the client 101, so that the management device 102 may return, based on the device identifier, stripe information to the client 101 corresponding to the device identifier. The device identifier of the client 101 may be either an internet protocol address (IP) of the client 101 or a media access control (MAC) address of the client 101. The device identifier is not limited in this embodiment.

In an EC implementation of N+M, each of N and M in this embodiment may have a plurality of values, so that the storage system in this embodiment has a plurality of EC modes. Therefore, the stripe that the client 101 requests to allocate from the management device 102 may further carry EC mode information. The values of M and N are not limited in this embodiment.

302: The management device 102 allocates the stripe to the client 101 according to the received stripe allocation request, and returns the stripe information to the client 101, where the stripe information includes a stripe unit identifier of the stripe.

The stripe unit identifier of the stripe is used to uniquely indicate the stripe unit included in the stripe. The stripe unit identifier may be a number randomly allocated by the management device 102 to the stripe unit of the stripe or may be a stripe unit identifier allocated by the management device 102 to the stripe unit of the stripe according to a preset stripe unit identifier allocation rule. Alternatively, the stripe unit identifier may be obtained through division by another device in the storage system. This is not limited in this embodiment. The preset stripe unit identifier allocation rule, an allocation manner of the stripe unit identifier, and a representation manner of the stripe unit identifier are not limited in this embodiment either.

303: The client 101 obtains the stripe unit identifier from the received stripe information.

304: The client 101 divides the to-be-written service data into the data blocks and generates the parity block of the data block according to each data block in the stripe and the EC algorithm.

As described above, the client 101 divides the to-be-written service data into the data blocks in a size of the stripe unit based on the size of the stripe unit of the stripe and generates the parity block of each data block according to the EC algorithm. The client 101 records metadata of the data block, namely, a correspondence between a user access address of the data block and the stripe unit identifier of the stripe unit corresponding to the stored data block. In this embodiment, a stripe unit that stores the data block is referred to as a data stripe unit, while a stripe unit that stores the parity block is referred to as a parity stripe unit.

A process of dividing the to-be-written service data into the data blocks may be any one of the following processes:

Process 1: When a size of the to-be-written service data is equal to sizes of all data stripe units of the stripe, the client 101 may divide the to-be-written service data into the data blocks based on the size of the block.

Process 2: When a size of the to-be-written service data is less than sizes of all data stripe units of the stripe, the client 101 may divide the to-be-written service data into the data blocks based on the size of the block. A quantity of data blocks obtained through division is less than a quantity of data stripe units of the stripe. For insufficient data blocks, 0 may be used to supplement these data blocks, or these data blocks are made empty. This is not limited in this embodiment.

Process 3: When a size of the to-be-written service data is greater than sizes of all data stripe units of the stripe, the client 101 may divide the to-be-written service data into the data blocks based on the size of the block. For remaining to-be-written service data, the client 101 may perform step 301, so that the management device 102 reallocates a stripe.

305: The client 101 adds a timestamp to the metadata of the data block, where the timestamp is used to indicate write time of the data block.

In this embodiment, the timestamp is a timestamp of the data block, namely, the write time of the data block. The time at which the data block is written may be time at which the client 101 sends the data block to a storage device that provides a storage space for the data stripe unit corresponding to the data block, or time at which a user writes data into the storage system. In an implementation, the timestamp may be a number, a version number, or the like that is of each of data blocks with a same user access address and that is performed by the client 101, or may be clock time of the storage system, or the like. The timestamp is not limited in this embodiment. A data block is used as an example. The user may modify the data blocks with the same user access address. Based on a timestamp, it may be determined which data block is a latest data block. A process of determining the latest block may be that: The client 101 obtains the timestamp of the data block and determines a new data block based on the timestamp of the data block, where the new data block and the data block have a same user access address.

306: The client 101 sends the data block and the metadata of the data block to a data storage device that stores the data block and sends the parity block and the metadata of the data block to a parity storage device that stores the parity block. The metadata of the data block includes the timestamp.

In the storage system, a relationship between a stripe unit of a stripe and a storage device is implemented by using a distributed algorithm. In an implementation, stripe units that are in a same location and that belong to a plurality of stripes in a same partition are located in a same storage device. For example, first stripe units of a stripe 1 and a stripe 2 that belong to a same partition are located in a same storage device, in other words, the same storage device provides a storage space. Therefore, after the data blocks with the same user access storage address are modified, modified data blocks are located in different stripes of a same partition, but are still located in a same storage device as the data blocks before modification.

For example, if the stripe includes five stripe units, and the five stripe units are respectively three data stripe units and two parity stripe units, for example, a data stripe unit 1, a data stripe unit 2, a data stripe unit 3, a parity stripe unit 1, and a parity stripe unit 2. According to the relationship between a stripe unit in a stripe and a storage device, for example, according to a correspondence between a stripe unit identifier and a storage device identifier, a corresponding block is sent to a corresponding storage device. For example, a data block 1 is stored in the data stripe unit 1, a data block 2 is stored in the data stripe unit 2, a data block 3 is stored in the data stripe unit 3, a parity block 1 is stored in the parity stripe unit 1, and a parity block 2 is stored in the parity stripe unit 2. The data stripe unit 1 corresponds to a data storage device 1, the data stripe unit 2 corresponds to a data storage device 2, the data stripe unit 3 corresponds to a data storage device 3, the parity stripe unit 1 corresponds to a parity storage device 1, and the parity stripe unit 2 corresponds to a parity storage device 2. The storage device is located on a storage node 103. Therefore, the client 101 needs to send the block to a storage node 103 on which the storage device is located before sending the corresponding block to the storage device.

The client 101 sends the data block 1 and metadata of the data block 1 to the data storage device 1 on a data storage node 1. The client 101 sends the data block 2 and metadata of the data block 2 to the data storage device 2 on the data storage device 2. The client 101 sends the data block 3 and metadata of the data block 3 to the data storage device 3 on the data storage device 3. The client 101 sends the parity block 1, the metadata of the data block 1, the metadata of the data block 2, and the metadata of the data block 3 to the parity storage device 1 on a parity storage node 4. The client 101 sends the parity block 2, the metadata of the data block 1, the metadata of the data block 2, and the metadata of the data block 3 to the parity storage device 2 on the parity storage device 5.

307: The data storage device receives the data block and the metadata of the data block that are sent by the client 101, and the parity storage device receives the parity block and the metadata of the data block that are sent by the client 101.

The data storage device 1 on the data storage node 1 receives the data block 1 and the metadata of the data block 1 that are sent by the client 101. The data storage device 2 on the data storage device 2 receives the data block 2 and the metadata of the data block 2 that are sent by the client 101. The data storage device 3 on the data storage device 3 receives the data block 3 and the metadata of the data block 3 that are sent by the client 101. The parity storage device 1 on the parity storage node 4 receives the parity block 1, the metadata of the data block 1, the metadata of the data block 2, and the metadata of the data block 3 that are sent by the client 101. The parity storage device 2 on the parity storage device 5 receives the parity block 2, the metadata of the data block 1, the metadata of the data block 2, and the metadata of the data block 3 that are sent by the client 101.

In this embodiment, the metadata of the data block may be backed up in the parity storage device. In addition to being stored in a corresponding data storage device, the metadata of the data block is further stored in the parity storage device, to complete a write operation. Therefore, write operation time is reduced. In addition, there are a plurality of copies of the metadata of the data block. This improves reliability of the metadata of the data block. Further, the client 101 writes the metadata of the data block into the parity storage device when writing the parity block into the parity storage device. This increases efficiency of storing a metadata copy of the data block and reduces the write operation time.

308: A data storage node 103 writes the metadata of the data block into a memory, writes the metadata of the data block into a recording log, and writes the data block into a data storage device on the data storage node. A parity storage node writes the metadata of the data block into a memory, writes the metadata of the data block into a recording log, and writes the parity block into a parity storage device on the parity storage node.

The memory of the data storage node stores the metadata of the data block of the data storage device distributed on the data storage node and the log, where the log is used to record a write operation of the metadata of the data block. The memory of the parity storage node stores the metadata of the data block and the log, where the log is used to record a write operation of the metadata of the data block. As described above, the data blocks with the same user access address have different versions due to modification. The data blocks with the same user access address are located on data storage devices on a same data storage node, and the memory of the data storage node stores metadata of the data blocks with the same user access address and logs. Based on the timestamp in the metadata of the data block, it may be determined that metadata of which data block is metadata of the new data block. Likewise, the memory of the parity storage node also stores metadata of a plurality of data blocks with a same user access address and logs.

309: The data storage node backs up the metadata of the data block to a metadata storage node and deletes the metadata of the data block in the memory of the data storage node and the write operation of the metadata of the data block in the log.

In this embodiment, the data storage node backs up the metadata of the data block to the metadata storage node. In an implementation, the metadata of the data block is sent to the metadata storage node, and the metadata storage node does not need to write the metadata of the data block into a metadata storage device on the metadata storage node. In another implementation, that the data storage node backs up the metadata of the data block to the metadata storage node means sending the metadata of the data block to the metadata storage node, and the metadata storage node needs to write the metadata of the data block into a metadata storage device of a metadata storage device on the metadata storage node.

In step 309, the plurality of copies of the metadata of the data block are stored. This improves reliability of the metadata of the data block. In addition, a memory space of the data storage node can be released in a timely manner. In this embodiment, a storage node 103 that stores the metadata of the data block is referred to as the metadata storage node. A storage device that is in the metadata storage node and that stores the metadata of the data block is referred to as the metadata storage device. A quantity of metadata storage nodes is not limited in this embodiment.

310: The data storage node notifies the parity storage node to delete metadata of an old data block in the memory of the parity storage node and a write operation that is of the metadata of the old data block and that is recorded in the log. The old data block and the data block have a same user access address, and a timestamp in the metadata of the old data block is earlier than the timestamp in the metadata of the data block.

When the data storage node backs up the metadata of the new data block to the metadata storage node, because the metadata of the new data block has been stored in the metadata storage node, a timestamp that is in the memory of the parity storage node and that is earlier than the timestamp of the metadata of the data block and the metadata of the old data block with the same user access address may be deleted, and the write operation that is of the metadata of the old data block and that is recorded in the log is also deleted. The metadata of the old data block with the same user access address is eliminated from memory of the parity storage node, to release a memory space of the parity storage node.

Before the data storage node stores metadata of a data block, if a timestamp of the metadata of the data block is greater than a timestamp of target metadata, it indicates that the data block is a latest block. A storage node 103 may directly write the metadata of the data block into the memory. In this case, there is no need to wait to write the metadata of the data block into a storage device. This reduces write operation time. The target metadata is metadata of all data blocks that are in the data storage node and that have a same user access as the data block.

In this embodiment, when the metadata of the data block is lost because the data storage node is faulty, a log of a write operation of the data block in the memory of the parity storage node may be obtained. For example, the write operation of the data block may be obtained from logs of a plurality of parity storage nodes, to prevent the metadata of the data block from being lost or inconsistent due to an error of a parity storage node. In an implementation, the data storage node may send a log obtaining request to the parity storage node, and the parity storage node sends, to the data storage node according to the log obtaining request, the write operation of the metadata that is of the data block and that includes the user access address. In an implementation, the parity storage node may send all logs to the data storage node.

In another implementation, the data storage node may add the user access address to the log obtaining request, and the parity storage node obtains, according to the user access address, the write operation of the metadata that is of the data block and that includes the user access address. The data storage node selects, from the metadata of the data blocks with the same access, metadata of a data block with a latest timestamp as metadata of the latest data block. This ensures data consistency. In an implementation, the latest timestamp may be a largest timestamp. When the client 101 is restarted and loses the timestamp of the latest data block, the client may query the data storage node for a current latest timestamp of the data block with the same user access address, and the data storage node returns the current latest timestamp of the data block with the same user access address to the client 101. The client 101 starts to allocate, based on the latest timestamp, a timestamp to the metadata of the data blocks with the same user access address.

According to the method provided in this embodiment, the client 101 sends the data block in the stripe and the metadata of the data block to the data storage node and sends the metadata of the data block and the parity block to the parity storage node. The data storage node or the parity storage node does not need to wait for metadata backup success but may directly store the received block in the storage device. This reduces the write operation time.

In some implementations, the client 101 may send the data block and the metadata of the data block to the data storage node and send the metadata of the data block and the parity block to the parity storage node. The data storage node and the parity storage node store the blocks and the metadata that are received by the data storage node and the parity storage node. Herein, an embodiment provides a data processing method in a storage system. The storage system includes a client 101, a data storage node, and a parity storage node, and the method includes:

The client 101 sends a data block in a stripe and metadata of the data block to the data storage node.

The client 101 sends a parity block in the stripe and the metadata of the data block to the parity storage node. The parity block is generated according to the data block in the stripe and a parity algorithm. A size of a parity block in the stripe is the same as a size of a data block in the stripe and is equal to a size of a stripe unit in the stripe. The metadata of the data block includes a correspondence between a user access address of the data block and an identifier of the stripe unit that stores the data block in the stripe.

Optionally, the metadata of the data block further includes a timestamp.

Optionally, the method further includes:

The client 101 obtains the timestamp of the data block; and determines a timestamp of a new data block based on the timestamp, where the new data block and the data block have a same user access address.

An embodiment provides a data processing method in a storage system. The storage system includes a client 101, a data storage node, a metadata storage node, and a parity storage node, and the method includes:

The data storage node receives a write request sent by the client 101, where the write request includes a data block of a stripe and metadata of the data block that are written into a storage device in the data storage node. A parity block of the stripe is stored in a storage device of the parity storage node. A memory of the parity storage node is further configured to store the metadata of the data block and record, in a log, a write operation of the metadata of the data block. The parity block is generated according to the data block in the stripe and a parity algorithm. A size of a parity block in the stripe is the same as a size of a data block in the stripe and is equal to a size of a stripe unit in the stripe. The metadata of the data block includes a correspondence between a user access address of the data block and an identifier of the stripe unit that stores the data block in the stripe.

The data storage node sends a write request response to the client 101, where the write request response is used to indicate completion of a write request operation.

Optionally, the method further includes: the data storage node stores the metadata of the data block to the metadata storage node after the data storage node sends the write request response to the client 101.

Optionally, the metadata of the data block further includes a timestamp, and the method further includes:

The data storage node notifies the parity storage node of deleting metadata of an old data block in the memory of the parity storage node and a write operation that is of the metadata of the old data block and that is recorded in the log. The old data block and the data block include a same user access address, and a timestamp of the old data block is earlier than the timestamp of the metadata of the data block.

Optionally, the method further includes:
when the data storage node recovers from a fault, obtaining, by the data storage node from the parity storage node in the log, the write operation of the metadata that is of the data block and that includes the user access address;
determining, in the log, metadata of a data block with a latest timestamp from the write operation of the metadata that is of the data block and that includes the user access address; and
using the metadata of the data block with the latest timestamp as the metadata of the data block corresponding to the user access address.

An embodiment provides a data processing method in a storage system. The storage system includes a client 101, a data storage node, a metadata storage node, and a parity storage node, and the method includes:

The parity storage node receives a write request sent by the client 101, where the write request includes metadata of a data block of a stripe and a parity block that are written into a storage device in the data storage node. The parity block is generated according to the data block in the stripe and a parity algorithm. A size of a parity block in the stripe is the same as a size of a data block in the stripe and is equal to a size of a stripe unit in the stripe. The metadata of the data block includes a correspondence between a user access address of the data block and an identifier of the stripe unit that stores the data block in the stripe.

The parity storage node caches the data block in a memory, and records, in a log, a write operation of the metadata of the data block.

Optionally, the metadata of the data block further includes a timestamp.

Optionally, the method further includes:

The parity storage node receives a notification sent by the data storage node, where the notification is used to indicate the parity storage node to delete metadata of an old data block in the memory of the parity storage node and a write operation that is of the metadata of the old data block and that is recorded in the log. The old data block and the data block include a same user access address, and a timestamp of the old data block is earlier than the timestamp of the metadata of the data block.

The parity storage node deletes, according to the notification, the metadata of the old data block in the memory and the write operation that is of the metadata of the old data block and that is recorded in the log.

Optionally, the method further includes:

The parity storage node receives a log obtaining request sent by the data storage node, where the log obtaining request is used to obtain, from the parity storage node in the log, the write operation of the metadata that is of the data block and that includes the user access address.

The parity storage node sends the write operation of the metadata that is of the data block and that includes the user access address to the data storage node.

To further implement the foregoing methods, an embodiment further provides a storage system. The storage system includes a data storage node and a parity storage node.

The data storage node is configured to:
Receive a first write request sent by the client 101, where the first write request includes a data block of a stripe and metadata of the data block that are written into a storage device in the data storage node, and the metadata of the data block includes a correspondence between a user access address of the data block and an identifier of a stripe unit that stores the data block in the stripe; and
send a write request response to the client 101, where the write request response is used to indicate completion of the first write request.

The parity storage node is configured to: receive a second write request sent by the client 101, where the second write request includes the metadata of the data block and a parity block, the parity block is generated according to the data block in the stripe and a parity algorithm, and a size of a parity block in the stripe is same as a size of a data block in the stripe, and is equal to a size of a stripe unit in the stripe; and
cache the data block in a memory of the parity storage node, and record, in a log, a write operation of the metadata of the data block.

Optionally, the data storage node is further configured to store the metadata of the data block in the metadata storage node after sending the write request response to the client 101.

Optionally, the metadata of the data block further includes a timestamp.

The data storage node is further configured to notify the parity storage node to delete metadata of an old data block in the memory of the parity storage node and a write operation that is of the metadata of the old data block and that is recorded in the log. The old data block and the data block include a same user access address, and a timestamp of the old data block is earlier than the timestamp of the metadata of the data block.

The parity storage node is further configured to: receive a notification sent by the data storage node, and delete, according to the notification, the metadata of the old data block in the memory and the write operation that is of the metadata of the old data block and that is recorded in the log.

Figure 4:
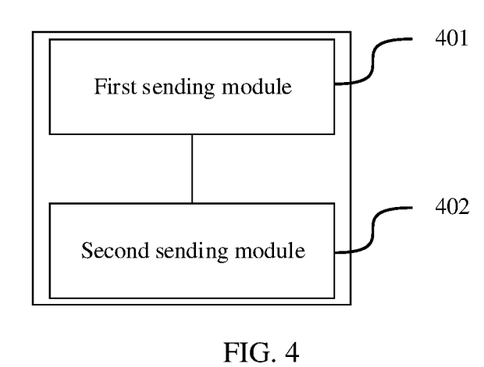
FIG. 4 is a schematic structural diagram of a data processing apparatus in a storage system according to an embodiment.

FIG. 4 is a schematic structural diagram of a data processing apparatus in a storage system according to an embodiment. The storage system includes the apparatus, a data storage node, and a parity storage node, and the apparatus includes:
a first sending module 401, configured to send a data block in a strip and metadata of the data block to the data storage node; and
a second sending module 402, configured to send a parity block in the stripe and the metadata of the data block to the parity storage node, where the parity block is generated according to the data block in the stripe and a parity algorithm, a size of a parity block in the stripe is the same as a size of a data block in the stripe and is equal to a size of a stripe unit in the stripe, and the metadata of the data block includes a correspondence between a user access address of the data block and an identifier of the stripe unit that stores the data block in the stripe.

Optionally, the metadata of the data block further includes a timestamp.

Optionally, the apparatus further includes:

an obtaining module, configured to obtain the timestamp of the data block; and a determining module, configured to determine a timestamp of a new data block based on the timestamp, where the new data block and the data block have a same user access address.

Figure 5:
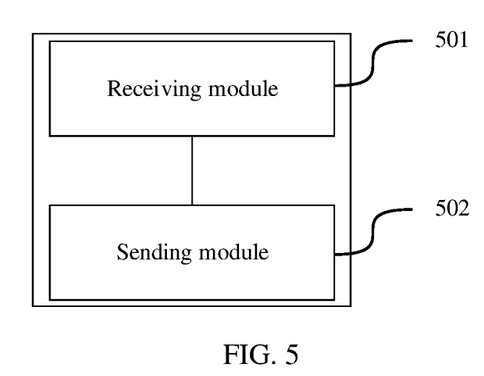
FIG. 5 is a schematic structural diagram of a data processing apparatus in a storage system according to an embodiment.

FIG. 5 is a schematic structural diagram of a data processing apparatus in a storage system according to an embodiment. The storage system includes a client 101, the apparatus, a metadata storage node, and a parity storage node, and the apparatus includes:

a receiving module 501, configured to receive a write request sent by the client 101, where the write request includes a data block of a stripe and metadata of the data block that are written into a storage device in the data storage node, a parity block of the stripe is stored in a storage device of the parity storage node, a memory of the parity storage node is further configured to store the metadata of the data block and record, in a log, a write operation of the metadata of the data block, the parity block is generated according to the data block in the stripe and a parity algorithm, a size of a parity block in the stripe is the same as a size of a data block in the stripe and is equal to a size of a stripe unit in the stripe, and the metadata of the data block includes a correspondence between a user access address of the data block and an identifier of the stripe unit that stores the data block in the stripe; and a sending module 502, configured to send a write request response to the client 101, where the write request response is used to indicate completion of a write request operation.

Optionally, the apparatus further includes:

a storage module, configured to: store the metadata of the data block in the metadata storage node after the sending module sends the write request response to the client 101.

Optionally, the metadata of the data block further includes a timestamp, and the apparatus further includes:

a notification module, configured to perform step 310.

Optionally, the apparatus further includes:

an obtaining module, configured to: when the apparatus recovers from a fault, obtain, by the data storage node from the parity storage node in the log, the write operation of the metadata that is of the data block and that includes the user access address; and a determining module, configured to determine, in the log, metadata of a data block with a latest timestamp from the write operation of the metadata that is of the data block and that includes the user access address.

The determining module is further configured to use the metadata of the data block with the latest timestamp as the metadata of the data block corresponding to the user access address.

Figure 6:
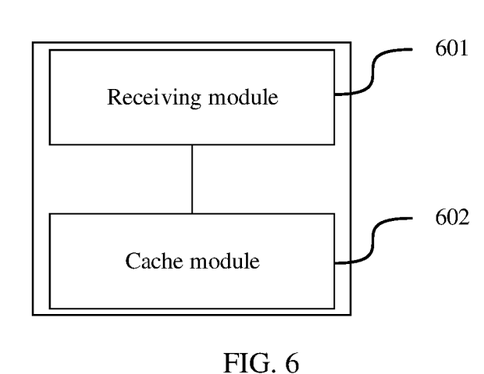
FIG. 6 is a schematic structural diagram of a data processing apparatus in a storage system according to an embodiment.

FIG. 6 is a schematic structural diagram of a data processing apparatus in a storage system according to an embodiment. The storage system includes a client 101, a data storage node, a metadata storage node, and the apparatus, and the apparatus includes:

A receiving module 601, configured to receive a write request sent by the client 101, where the write request includes metadata of a data block of a stripe and a parity block that are written into a storage device in the data storage node, the parity block is generated according to the data block in the stripe and a parity algorithm, a size of a parity block in the stripe is the same as a size of a data block in the stripe and is equal to a size of a stripe unit in the stripe, and the metadata of the data block includes a correspondence between a user access address of the data block and an identifier of the stripe unit that stores the data block in the stripe; and a cache module 602, configured to cache the data block in a memory and record, in a log, a write operation of the metadata of the data block.

Optionally, the metadata of the data block further includes a timestamp.

Optionally, the apparatus further includes a deletion module.

The receiving module 601 is further configured to receive a notification sent by the data storage node, where the notification is used to indicate the parity storage node to delete metadata of an old data block in the memory of the parity storage node and a write operation that is of the metadata of the old data block and that is recorded in the log. The old data block and the data block include a same user access address, and a timestamp of the old data block is earlier than the timestamp of the metadata of the data block.

The deletion module is configured to delete, according to the notification, the metadata of the old data block in the memory and the write operation that is of the metadata of the old data block and that is recorded in the log.

Optionally, the apparatus further includes a sending module.

The receiving module 601 is further configured to receive a log obtaining request sent by the data storage node. The log obtaining request is used to obtain, from the parity storage node in the log, the write operation of the metadata that is of the data block and that includes the user access address.

The sending module is configured to send the write operation of the metadata that is of the data block and that includes the user access address to the data storage node.

An embodiment further provides a storage medium, and the storage medium stores at least one instruction. A processor loads and executes the instruction to implement operations when the client 101, the data storage node, or the parity storage node performs the data processing method in the storage system.

In an implementation, the modules in the apparatuses in the embodiments may be implemented by using a hardware component, a software module, or a combination of a hardware component and a software module. This is not limited in the embodiments.

What is claimed is:

1. A method in a storage system, wherein the storage system comprises a client, a data storage node, and a parity storage node, the method comprising:

determining, by the client, a data block and a parity block in a stripe, wherein the parity block in the stripe is generated according to the data block in the stripe and a parity algorithm, a size of the parity block in the stripe is the same as a size of the data block in the stripe and is equal to a size of a stripe unit in the stripe, and the parity block and the data block belong to a same stripe;

determining, by the client, a metadata of the data block according to the stripe unit identifier of the strip, wherein the metadata of the data block comprises a correspondence between a user access address of the data block in the stripe and an identifier of the stripe unit that stores the data block in the stripe, and the metadata of the data block further comprises a timestamp that is used to determine a new data block;

sending, by the client, the data block and metadata of the data block to the data storage node; and sending, by the client, the parity block and the metadata of the data block to the parity storage node.

2. The method according to claim 1, wherein the method further comprises:

obtaining, by the client, a timestamp of the data block; and determining a timestamp of the new data block based on the timestamp of the data block, wherein the new data block and the data block have a same user access address.

3. A method in a storage system, wherein the storage system comprises a client, a data storage node, a metadata storage node, and a parity storage node, the method comprising:

receiving, by the data storage node, a write request sent by the client, wherein the write request comprises a data block in a stripe and metadata of the data block that are written into a storage device in the parity storage node, a parity block in the stripe is stored in the storage device of the parity storage node, a memory of the parity storage node is further configured to store the metadata of the data block and record, in a log, a write operation of the metadata of the data block, the parity block in the stripe is generated according to the data block in the stripe and a parity algorithm, a size of the parity block in the stripe is the same as a size of the data block in the stripe and is equal to a size of a stripe unit in the stripe, the metadata of the data block comprises a correspondence between a user access address of the data block in the stripe and an identifier of the stripe unit that stores the data block in the stripe, the parity block and the data block belong to a same stripe, and the metadata of the data block further comprises a timestamp that is used to determine a new data block; and sending, by the data storage node, a write request response to the client, wherein the write request response is used to indicate completion of the write request.

4. The method according to claim 3, further comprising:

after the data storage node sends the write request response to the client, storing, by the data storage node, the metadata of the data block in the metadata storage node.

5. The method according to claim 4, wherein the metadata of the data block further comprises a timestamp, further comprising:

notifying, by the data storage node, the parity storage node to delete metadata of an old data block in the memory of the parity storage node and a write operation that is of the metadata of the old data block and that is recorded in the log, wherein the old data block and the data block comprise a same user access address, and a timestamp of the old data block is earlier than the timestamp of the metadata of the data block.

6. The method according to claim 3, further comprising:

when the data storage node recovers from a fault, obtaining, by the data storage node from the parity storage node in the log, a write operation of the metadata that is of the data block and that comprises the user access address;

determining, in the log, metadata of a data block with a latest timestamp from the write operation of the metadata that is of the data block and that comprises the user access address; and using the metadata of the data block with the latest timestamp as the metadata of the data block corresponding to the user access address.

7. A data storage node, wherein the data storage node comprises a processor and an interface, the processor communicates with the interface, and the processor is configured to:

receive a write request sent by a client, wherein the write request comprises a data block in a stripe and metadata of the data block that are written into a storage device in the parity storage node, a parity block in the stripe is stored in the storage device of the parity storage node, a memory of the parity storage node is further configured to store the metadata of the data block and record, in a log, a write operation of the metadata of the data block, the parity block is generated according to the data block in the stripe and a parity algorithm, a size of the parity block in the stripe is the same as a size of the data block in the stripe and is equal to a size of a stripe unit in the stripe, the metadata of the data block comprises a correspondence between a user access address of the data block and an identifier of the stripe unit that stores the data block in the stripe, the parity block and the data block belong to a same stripe, and the metadata of the data block further comprises a timestamp that is used to determine a new data block; and send a write request response to the client, wherein the write request response is used to indicate completion of the write request.

8. The data storage node according to claim 7, wherein the processor communicates with the interface, and the processor is further configured to:

after the data storage node sends the write request response to the client, store the metadata of the data block in the metadata storage node.

9. The data storage node according to claim 8, wherein the metadata of the data block further comprises a timestamp, and the processor is further configured to:

notify the parity storage node to delete metadata of an old data block in the memory of the parity storage node and a write operation that is of the metadata of the old data block and that is recorded in the log, wherein the old data block and the data block comprise a same user access address, and a timestamp of the old data block is earlier than the timestamp of the metadata of the data block.

10. The data storage node according to claim 7, wherein the processor is further configured to:

when the data storage node recovers from a fault, obtain from the parity storage node in the log, a write operation of the metadata that is of the data block and that comprises the user access address;

determine, in the log, metadata of a data block with a latest timestamp from the write operation of the metadata that is of the data block and that comprises the user access address; and use the metadata of the data block with the latest timestamp as the metadata of the data block corresponding to the user access address.

* * * * *